Figure 1:
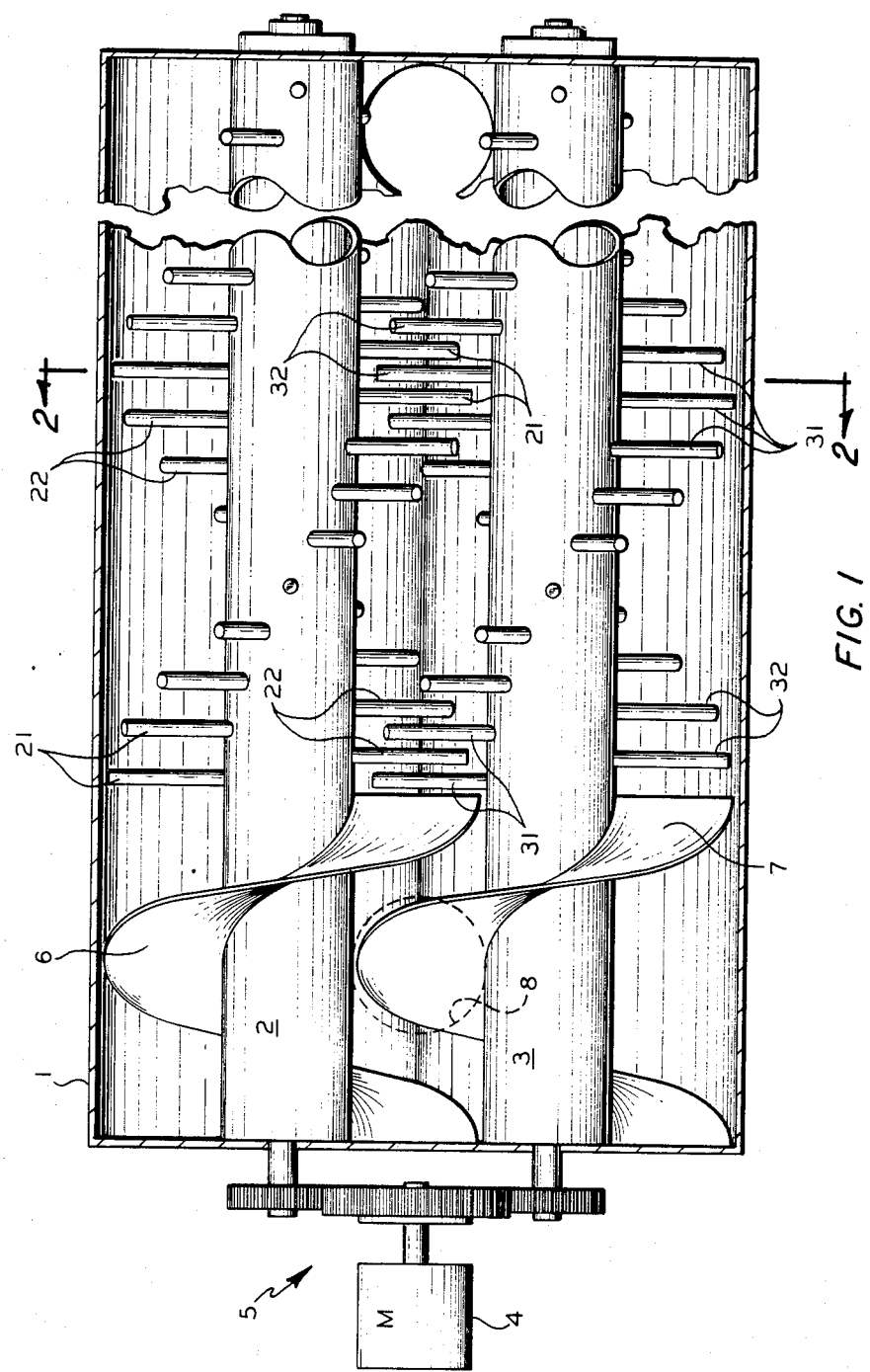

United States Patent [19]

Kertok

[11] Patent Number: 4,502,858
[45] Date of Patent: Mar. 5, 1985

[54] MIXING APPARATUS

[75] Inventor: Mark E. Kertok, Bartlesville, Okla.

[73] Assignee: Phillips Petroleum Company, Bartlesville, Okla.

[21] Appl. No.: 480,207

[22] Filed: Mar. 30, 1983

[51] Int. Cl.³ .............................................. B29B 1/02
[52] U.S. Cl. .................................... 425/204; 425/209; 425/222
[58] Field of Search ............. 425/204, 222, DIG. 101, 425/209

[56] References Cited

U.S. PATENT DOCUMENTS

| 2,828,191 | 3/1958 | Glaxner et al. | 23/314 |
| 2,861,294 | 11/1958 | Glaxner et al. | 425/DIG. 101 |
| 3,049,750 | 8/1962 | Austin | 425/DIG. 101 |
| 3,730,663 | 5/1973 | Hare | 425/222 |
| 3,751,543 | 8/1973 | Hare | 264/117 |
| 4,222,727 | 9/1980 | Adachi et al. | 425/222 |

Primary Examiner—Donald Czaja
Assistant Examiner—V. Fischbach

[57] ABSTRACT

A mixing apparatus particularly useful in carbon black pelleting has two parallel pinned shafts. The pins on each shaft are arranged in a double helix fashion with the pins interdigitating. The pins of each double helix are composed of two subsets of pins arranged in a single helix which single helices are, however, axially offset from each other. Thereby at any given axial location alternatingly opposite pin action is provided in the interdigitating zone, while surging of power is avoided.

11 Claims, 3 Drawing Figures

MIXING APPARATUS

This invention relates to a mixing apparatus based upon the action of interdigitating pins on rotatable shafts. More specifically this invention relates to a carbon black pelleter.

BACKGROUND OF THE INVENTION

Mixing apparatuses and pelleters, in particular carbon black pelleters, are known in the art. Pinned shafts rotatably arranged in housings have been described for these purposes. It is also known to employ two shafts arranged parallel in a housing, each shaft being provided with groups of pins arranged in straight lines, in a comb-like arrangement, with these combs interdigitating while the shafts are rotated. Such an apparatus is described, for instance, in U.S. Pat. No. 3,751,543. These comb-like structures cause power surging of the mechanism driving the shafts.

Other pelleting apparatuses utilize a plurality of pinned shafts arranged horizontally on top of each other with alternating right hand and left hand flights of partial double helices. Such an apparatus is, for instance, described in U.S. Pat. No. 2,828,191. In this apparatus at any given axial location the pin movement is always in the same direction, i.e. either from left to right or from right to left.

THE INVENTION

It is one object of this invention to provide a new mixing apparatus with little or no power surging.

A further object of this invention is to provide a carbon black pelleting apparatus providing uniform pellets and having approximately constant power intake.

Another object of this invention is to provide a more mechanically efficient pelleter.

Figure 2:
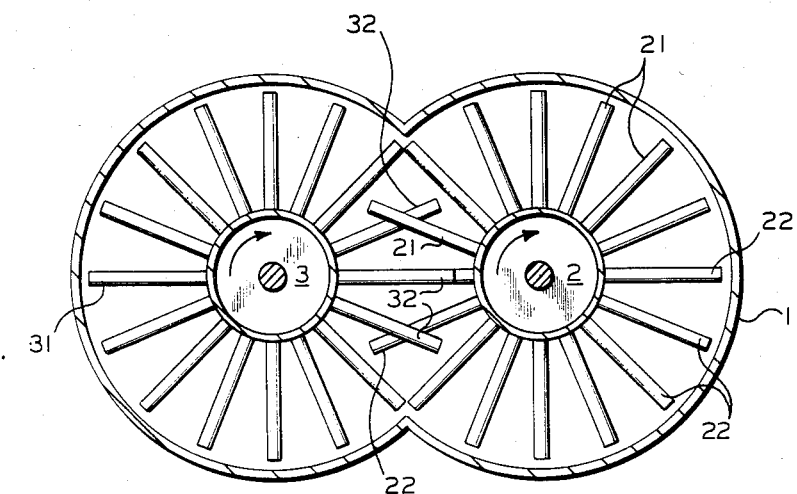
Figure 3:
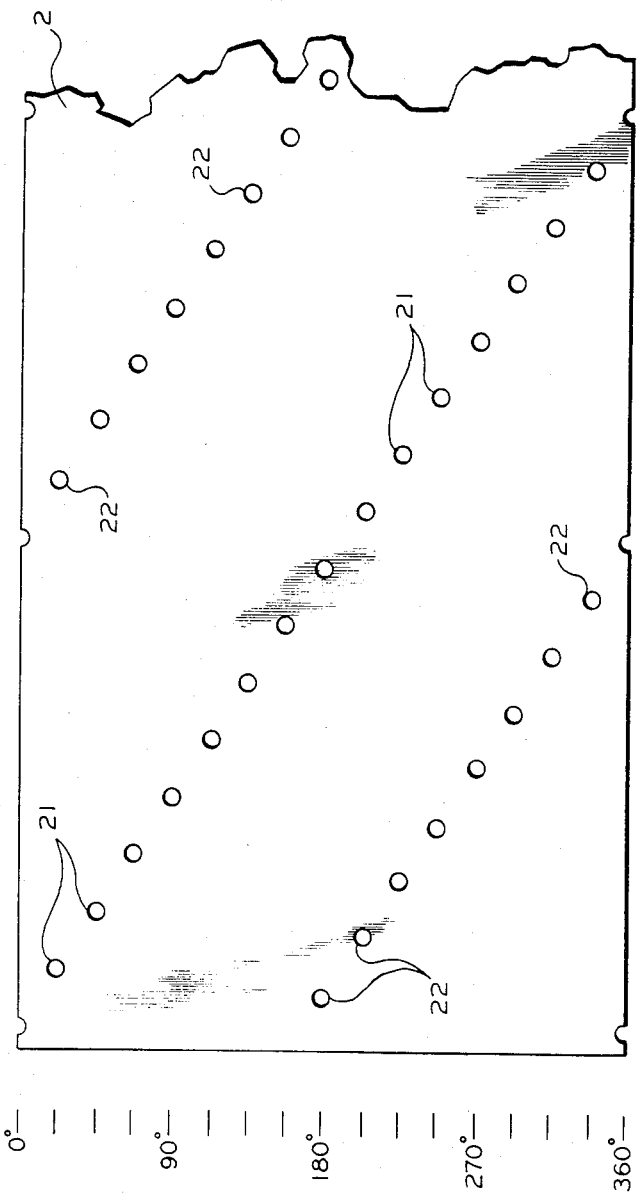

These and other objects, advantages, details, features and embodiments of this invention will become apparent to those skilled in the art from the following detailed description of the invention, the appended claims and the drawing in which:

FIG. 1 is a fragmental top plane view with the top half of the housing removed, of the mixer of this invention, FIG. 2 is a cross sectional view of the apparatus shown in FIG. 1 along line 2—2, FIG. 3 is a planar view of the cylindrical surface of one shaft with the pin locations shown, the outer surface being rolled into a plane.

In accordance with this invention a mixing apparatus comprising two pinned shafts arranged in parallel is provided. The pins on each shaft are arranged in a double helix structure. The pins in one helix are axially offset with respect to the pins of the other helix on the same shaft. In other words, except for the end pins of the helices, each pin belonging to one helix of the double helix of one shaft is arranged axially in the space between pins belonging to the other helix of the double helix of the same shaft. Collision between pins is avoided by synchronizing the rotation of the two shafts. The inventive arrangement of the pins causes an alternating movement of pins at any given axial location. Thus, both power surging is avoided and a maximum change of mixing direction at each location during the operation is achieved in accordance with this invention. The opposite pin action in the interdigitating zone produces greater shear forces and hence more work is performed on the carbon black. Work input to the black is directly related to the time it takes to form pellets and the ease with which pellets are formed.

While it is within the scope of this invention that the helices are of different sense and thus the rotational direction of the shaft is opposite, it is presently preferred that the helices on the two shafts are all of the same sense and the shafts are rotated in the same sense as well as in the same speed.

Thus in accordance with a first embodiment an apparatus is provided comprising a first shaft having a first axis and arranged for rotation around this first axis. The apparatus further has a second shaft having a second axis and arranged for rotation around this second axis. Both shafts have sets of pins attached to the shaft and extending preferably essentially radially outwardly from the shafts. The apparatus is provided with means for rotating both shafts at the same azimuthal speed and, as pointed out, preferably in the same rotational sense. The first set of pins on the first shaft is arranged in the form of two substantially identical helices A and B. The pins of helix A are offset with respect to the pins of helix B both azimuthally and axially. The azimuthal offset is preferably about 180°, while the axial offset is preferably by a distance which is about ½ of the axial distance between pins adjacent along the same helix. The second set of pins on the second shaft is arranged substantially in the same way. The two shafts are arranged parallel to each other and in such a fashion that the pins of each helix A of one shaft interdigitate with the pins of helix B of the other shaft.

The mixing apparatus of this invention can also be described as one comprising two parallel shafts each provided with a set of upon shaft rotation interdigitating pins. Each set of pins is arranged in a double helix around the shaft. The pins of each helix of one double helix are axially offset with respect to the pins of the other helix of the same double helix of the same shaft. Thereby at any given axial location and looking in axial direction the pin movement action alternates in time from one direction to essentially the opposite direction. Thus, if the two shaft axes are arranged in a horizontal plane the pin movement in the interdigitating zone at any given axial location alternates between up→down to down→up to up→down and so forth.

Yet another way of describing the mixing apparatus of this invention is as follows. The apparatus comprises two parallel shafts arranged for synchronous co-rotation of counter-rotation around their axes. Drive means for rotating both shafts at the same azimuthal speed are provided for. Each shaft has attached thereto a set of radial pins interdigitating with the other set of radial pins during rotation. Each set of pins of one shaft is composed of a first and a second helically arranged subset of pins. The axial location of the first helical subset of pins of one shaft and the first helical subset of the other shaft being such that these pins would collide upon shaft rotation, that such a collision of these pins is, however, avoided by the azimuthal position of the otherwise colliding pins and the synchronized shaft rotation.

A further embodiment of this invention resides in a carbon black pelleting apparatus. This carbon black pelleting apparatus is characterized by the pinned shaft arrangement described above. In addition the apparatus is characterized by a housing surrounding the pinned shafts. Furthermore, a source of loose carbon black connected to one end of the housing for introducing loose carbon black into the housing is provided for. A source of pelleting fluid such as water or molasses, when desired, is also connected to the housing introducing of a pelleting fluid. In addition, the housing is provided with an outlet 50 for removing carbon black pellets. This outlet end is attached to the housing at the opposite end from the end connected to the carbon black supply.

Preferably each shaft is provided with a screw flight at one end which screw flights are arranged to receive carbon black introduced into the housing at the end where the housing is connected to the carbon black source. These screw flights function to move the carbon black into the mixing and pelleting section of the pelleter.

The housing surrounding the pinned shafts in a cross section perpendicular to the axis of the shafts defines a chamber having the shape of an incomplete eight or the shape of two circle segments. The angular or azimuthal opening of these circles by which the circle segments are connected is less than 120°. The maximum size of this angle is dependent upon the relative size of the shaft diameter and the pin length.

While a helix can be drawn through many arrangements of pins on the shafts only really helical structures are intended to be encompassed by this invention. Thus the angular or azimuthal distance between adjacent pins on one helix is less than 45°. In other words, the pitch of the helix here envisaged is more than eight times the axial distance between adjacent pins on one helix. In the preferred embodiment, each single helix here involved comprises more than one full loop, i.e. azimuthally is more than 360° long. Most preferably, the apparatus of this invention has the pins arranged in helices comprising 1.5 to 3.5 (full 360°) flights. The preferred azimuthal distance between adjacent pins on each single helix is 360°/n with n being in the range of 8 to about 24.

Further details and preferred embodiments of this invention will become apparent from the following description of the drawing which is intended to further illustrate the invention without unduly limitation of its scope.

FIGS. 1 and 2 show a top plane view and a cross sectional view through a carbon black pelleter including the mixer of this invention. In a housing 1 two parallel shafts 2 and 3 are rotatably arranged. The shafts 2 and 3 can be driven synchronously and at the same azimuthal speed by a variable speed motor 4 through a gear arrangement in gear box 5. Each shaft is provided with a screw flight section 6 and respectively 7. These screw flights have the function of moving, e.g. carbon black introduced through a inlet opening 8 toward the mixing section of the apparatus.

The shafts 2 and 3 are each provided with sets of pins arranged in a double helical structure. Pins 21 form a first subset of pins helically arranged around shaft 2, helix A. Pins 22 form a second subset of pins helically arranged around shaft 2, helix B. Similarly, pins 31 form a first subset of pins helically arranged around shaft 3, helix A, while pins 32 form a second subset of pins helically arranged around shaft 3, helix B. The subset of pins 21 and the subset of pins 22 together forms a set of pins arranged in a double helix around shaft 2; correspondingly the pins 31 of the first helical subset and the pins 32 of the second helical subset form a set of pins arranged as a double helix around shaft 3. The first subset of pins 21 of shaft 2 and the second subset of pins 32 of shaft 3 interdigitate, as can be seen in the central area of the shaft section shown in FIG. 1. Correspondingly, the second subset of pins 22 of shaft 2 and the first subset of pins 31 of shaft 3 interdigitate as can be seen in the left and right areas of the pinned shaft section shown in FIG. 1.

FIG. 1 also shows that pins 21 and pins 31 would collide upon shaft rotation, but for the fact that the synchronous rotation of the shafts at the same speed prevents this collision. The same is true for the pins 32 and 22.

During the operation of the mixing apparatus any given axial location in the area of pin interdigitation "sees" alternating movements of pins. A movement of a pin on shaft 2 in one direction is followed by a movement of a pin on shaft 3 in the opposite direction and so forth. At the same time surging of the mixing apparatus is substantially avoided due to the fact that the amount of interdigitation of pins is substantially unchanged.

Attention is drawn to the fact that in FIG. 2 in the interdigitating zone, pins 32 and 22 seem to interdigitate. This is not the case, however. Rather pins 32 and 22 shown in this interdigitating zone in FIG. 2 are axially approximately $\frac{1}{2}$ pitch apart. The interdigitation is between pins 32 and 21.

FIG. 3 shows a planar view of the arrangement of the pins around one shaft surface. For this purpose the shaft surface has been rolled into a plane. The angular position of the pins has been indicated by the degrees shown in FIG. 3. The pins on shaft 2 have been given the same numbers as in FIGS. 1 and 2. The axial offset of the set of pins 21 over the set of pins 22 can clearly be seen in FIG. 3.

The mixing or respectively pelleting apparatus of this invention can be made out of conventional materials such as stainless steel. The pins can be cylindrical or have other cross sections. The pin ends can be flat, can be rounded, can be pointed.

The following list shows specific design dimension specifications and operating conditions for a mixing apparatus in accordance with this invention which can be used as a carbon black pelleter.

| Pin Configuration: | Double Helix |
| --- | --- |
| No. Pins per Flight: | 16 (22.5° apart) |
| Pin Diameter: | 0.375" |
| Pin Length: | 3.25" |
| Axial Pin Spacing: | 1.25" |
| Pin Flight Length: | 20.00" |
| Pin to Shell Clearance: | 0.25" |
| Pin to Pin Clearance: | 0.25" |
| Pin Tip to Shaft Clearance: | 0.50" |
| Shell Diameter, inside: | 10.00" |
| Shell Length, inside: | 48.00" |
| Shaft O.D.: | 3.00" |
| Shaft RPM: | 400–1200 |
| Shaft Center to Center: | 6.75" |
| Screw Flight Length: | 8.00" |

Reasonable modifications and variations which will become apparent to those skilled in the art can be made in this invention without departing from the spirit and scope thereof.

That which is claimed is:
1. Apparatus comprising
   (a) a first shaft having a first axis, arranged for rotation around this first axis,
   (b) a first set of pins attached to said first shaft, (c) a second shaft having a second axis, arranged for rotation around this second axis, said first and second axis being substantially parallel to each other, (d) a second set of pins attached to said second shaft, (e) means for rotating both shafts at the same azimuthal speed, with the proviso that (f) said first set of pins is arranged on said first shaft in the form of two helices A and B, the pins of helix A being offset with respect to the pins of helix B both azimuthally and axially, (g) said second set of pins is arranged on said second shaft in the form of two helices A and B, the pins of helix A being offset with respect to the pins of helix B both azimuthally and axially, (h) upon rotation of the shafts the pins of helix A of said first set and pins of helix B of said second set sequentially interdigitate, and the pins of helix B of said first set and the pins of helix A of said second set sequentially interdigitate.

2. Apparatus in accordance with claim 1 wherein the pins of helix A are offset with respect to the pins of helix B, namely azimuthally by about 180° and axially by about ½ of the axial distance between adjacent pins along the same helix.

3. Apparatus comprising two parallel shafts, each provided with a set of pins interdigitating upon shaft rotation with the set of pins of the other shaft, each set arranged in a double helix around the shaft, wherein the pins of each helix of the double helix are axially offset with respect to the pins of the other helix on the shaft.

4. Apparatus comprising (a) two parallel shafts arranged for synchronous co-rotation around the shaft axis, (b) drive means for rotating both shafts at the same azimuthal speed, (c) two sets of pins, each attached to one shaft, the pins of one set interdigitating with the pins of the other set during shaft rotation, (d) each set of pins of one shaft (aa) being composed of a first and a second helically arranged subset of pins, (bb) the axial location of the first helical subset of one shaft and the first helical subset of the other shaft being such that the pins would collide upon shaft rotation, that collision of these pins is, however, avoided by the azimuthal position of the otherwise colliding pins and the synchronized shaft rotation.

5. Apparatus in accordance with claim 4 wherein each set of pins is arranged as a double helix composed of two helices of same sense, the pins of one helix being axially offset with respect to the pins of the other helix by approximately ½ of the axial pin distance of adjacent pins along one helix.

6. Apparatus in accordance with claim 5 wherein said two helices of said double helix are approximately 180° offset with respect to each other.

7. Apparatus in accordance with claim 1 wherein said pinned shafts are arranged in a housing confining a chamber having the shape of two parallel circular cylinder sections connected along two straight lines parallel to the shaft axis.

8. Apparatus in accordance with claim 3 wherein said pinned shafts are arranged in a housing confining a chamber having the shape of two parallel circular cylinder sections connected along two straight lines parallel to the shaft axis.

9. Apparatus in accordance with claim 4 wherein said pinned shafts are arranged in a housing confining a chamber having the shape of two parallel circular cylinder sections connected along two straight lines parallel to the shaft axis.

10. Apparatus for pelleting carbon black comprising (a) a first shaft having a first axis, arranged for rotation around this first axis, (b) a first set of pins attached to said first shaft, (c) a second shaft having a second axis, arranged for rotation around this second axis, said first and second axis being substantially parallel to each other, (d) a second set of pins attached to said second shaft, (e) means for rotating both shafts at the same azimuthal speed, with the proviso that (f) said first set of pins is arranged on said first shaft in the form of two helices A and B, the pins of helix A being offset with respect to the pins of helix B both azimuthally and axially, (g) said second set of pins is arranged on said second shaft in the form of two helices A and B, the pins of helix A being offset with respect to the pins of helix B both azimuthally and axially, (h) upon rotation of the shafts the pins of helix A of said first set and the pins of helix B of said second set sequentially interdigitate, and the pins of helix B of said first set and the pins of helix A of said second set sequentially interdigitate, (i) a housing substantially surrounding the pinned shafts, (j) an inlet opening into said housing close to one end of said housing, (k) a source of loose, flocculent carbon black, (l) means for feeding loose, flocculant carbon black from said source to said opening and into said housing, (m) an outlet connected to the other end of said housing for removing pelletized carbon black from said housing.

11. Apparatus in accordance with claim 10 wherein said first and said second axis are arranged substantially in the same horizontal plane.

* * * * *